United States Patent Office 3,485,847
Patented Dec. 23, 1969

3,485,847
4-ARYL-1,4-DIHYDROPYRIDINES
Friedrich Bossert, Wuppertal-Elberfeld, and Wulf Vater, Opladen, Germany, assignors to Farbenfabriken Bayer Aktiengesellschaft, Leverkusen, Germany, a corporation of Germany
No Drawing. Filed Mar. 14, 1968, Ser. No. 712,910
Claims priority, application Germany, Mar. 20, 1967, F 51,881
Int. Cl. C07d 29/40; A61k 27/00
U.S. Cl. 260—295.5     27 Claims

ABSTRACT OF THE DISCLOSURE 4-phenyl-1,4-dihydropyridines of the formula:

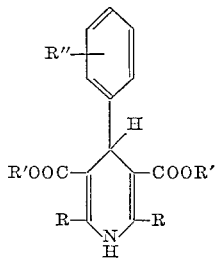

wherein
R is hydrogen or alkyl of 1 to 3 carbon atoms,
R' is alkyl of 1 to 4 carbon atoms, and
R" is hydrogen, halogen, or 1 or 2 lower alkyl, lower alkoxy, nitro, lower acylamino, lower alkylamino or amino moieties are produced by reacting benzaldehydes or substituted benzaldehydes with acyl fatty acid esters of the formula R—CO—CH$_2$—COOR' wherein R and R' are as above defined with ammonia. These 4-phenyl-1,4-dihydropyridines are useful in treating diseases of the circulation, especially those concerning coronaries. They are particularly useful in the treatment of angina pectoris.

The present invention is concerned with 4-aryl-1,4-dihydropyridines. More particularly, the present invention is concerned with 4-phenyl-1,4-dihydropyridines of the formula:

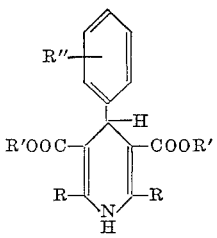

wherein
R is hydrogen or alkyl of 1 to 3 carbon atoms,
R' is alkyl of 1 to 4 carbon atoms, and
R" is hydrogen, halogen, or 1 or 2 lower alkyl, lower alkoxy, nitro, lower acylamino, lower alkylamino or amino moieties. These compounds are prepared by reacting benzaldehyde or benzaldehydes substituted by halogen, 1 or 2 lower alkyl, lower alkoxy, nitro, lower acylamino, lower alkylamino or amino moieties with acyl fatty acid esters of the formula R—CO—CH$_2$—COOR' wherein R and R' are as above defined with ammonia in the presence of an organic solvent, such as methanol or alcohol. The amino-substituted compounds are obtained by reduction of the corresponding nitro compounds.

Because of the increasing importance of therapeutic substances which can be used in the treatment of diseases of the circulation and particularly those involving coronaries of the heart, the compounds of the present invention are of particular importance. Moreover, the compounds which are presently commercially available, such as dipyramidol and carbochromene which initially appeared to be promising, based on intravenous administration to animals, have not fulfilled their initial promise and have not always shown with certainty clinical success when used in the treatment of coronary insufficiency, particularly in the treatment of angina pectoris. As a result, nitrates are still the prime medication prescribed and the effectiveness of nitrates is based on the weight of the heart.

It has now been surprisingly discovered that the compounds of the present invention produce a marked coronary dilation of long lasting duration when administered either intravenously or per os. The 4-phenyl-1,4-dihydropyridines of the present invention have been found to be superior to all hitherto known commercial products in duration of effectiveness and peroral effect. The action of these compounds against disturbances of the coronary blood supply is most likely favorably influenced by a nitrate effect which presumably occurs simultaneously.

The following non-limitative examples illustrate the production of compounds according to the present invention.

EXAMPLE 1

4-(2'-nitrophenyl)-2,6-dimethyl-3,5-dicarbomethoxy-1,4-dihydropyridine 45 g. 2 - nitrobenzaldehyde, 80 cc. acetoacetic acid methyl ester, 75 cc. methanol and 32 cc. ammonia are heated under reflux for several hours, filtered off, cooled and, after suction-filtration, 75 g. of yellow crystals of M.P. 172° C. to 174° C. are obtained.

In an analogous manner there are obtained:
from 2-nitro-benzaldehyde, acetoacetic acid ethyl ester and ammonia, 4 - (2' - nitrophenyl) - 2,6 - dimethyl-3,5 - dicarbethoxy - 1,4 - dihydropyridine, M.P. 122° C. to 124° C.,
from 2-nitrobenzaldehyde, acetoacetic acid, isopropyl acid and ammonia, 4 - (2' - nitrophenyl) - 2,6 - dimethyl - 3,5 - dicarbo - isopropoxy - 1,4 - dihydropyridine, M.P. 140° C. to 142° C.

EXAMPLE 2

4-(3'-nitrophenyl)-2,6-dimethyl-3,5-dicarbethoxy-1,4-dihydropyridine

After boiling for 6 hours, 151 g. 3-nitrobenzaldehyde 260 cc. acetoacetic acid ethyl ester, 250 cc. methanol and 110 cc. ammonia, there are obtained 300 g. of yellow crystals of M.P. 161° C.

In an analogous manner there are obtained:

from 3-nitrobenzaldehyde, acetoacetic acid methyl ester and ammonia, 4 - (3'-nitrophenyl)-2,6-dimethyl-3,5-dicarbomethoxy-1,4-dihydropyridine, M.P. 206° C.–208° C., from 3-nitrobenzaldehyde, acetoacetic acid isopropyl ester and ammonia, 4-(3'-nitrophenyl)-2,6-dimethyl-3,5-dicarbo-isopropoxy-1,4-dihydropyridine, M.P. 123° C., from 3-nitro-4-chlorobenzaldehyde, acetoacetic acid ethyl ester and ammonia, 4-(3'-nitro-4'-chlorophenyl)-2,6-dimethyl-3,5-dicarbethoxy-1,4-dihydropyridine, M.P. 133° C., from 3 - nitro - 6 - chlorobenzaldehyde, acetoacetic acid methyl ester and ammonia, 4 - (3' - nitro - 6' - chlorophenyl) - 2,6-dimethyl-3,5-dicarbomethoxy-1,4-dihydropyridine, M.P. 190° C.–192° C., from 3 - nitro - 6 - chlorobenzaldehyde, acetoacetic acid methyl ester and ammonia, 4-(3-nitro-6'-chlorophenyl)-2,6 - dimethyl - 3,5 - dicarbethoxy-1,4-dihydropyridine, M.P. 202° C.–205° C.

EXAMPLE 3

4 - (4' - nitrophenyl) - 2,6 - dimethyl-3,5-dicarbethoxy-1,4-dihydropyridine 151 g. 4-nitrobenzaldehyde, 300 cc. methanol, 260 cc. acetoacetic acid ethyl ester and 110 cc. ammonia are heated under reflux for 5 hours and, after cooling and suction-filtration, there are obtained 375 g. of yellow crystals which melt at 132° C.–134° C. after recrystallization from methanol.

In an analogous manner there are obtained:

from 4-nitrobenzaldehyde, acetoacetic acid methyl ester and ammonia, 4-(4'-nitrophenyl)-2,6-dimethyl-3,5-dicarbomethoxy-1,4-dihydropyridine, M.P. 196° C.–197° C., from 4-nitrobenzaldehyde, acetoacetic acid isopropyl ester and ammonia, 4-(4'-nitrophenyl)-2,6-dimethyl-3,5-dicarbo-isopropoxy-1,4-dihydropyridine, M.P. 152° C., from 4 - nitrobenzaldehyde, acetoacetic acid tert.-butyl ester and ammonia, 4-(4-nitrophenyl)-2,6-dimethyl-3,5-dicarbo-tert.-butoxy-1,4-dihydropyridine, M.P. 215° C.

EXAMPLE 4

4 -(4'-aminophenyl)-2,6-dimethyl-3,5-dicarbo-isopropoxy-1,4-dihydropyridine 120 g. 4-(4'-nitrophenyl)-2,6-dimethyl-3,5-dicarboisopropoxy-1,4-dihydropyridine are kept in 500 cc. isopropanol in the presence of 10 g. Raney nickel under hydrogen (pressure autoclave, 70° C.) and, when the hydrogen absorption is completed (1½ to 2 hours), the product is filtered off with suction. After concentration and cooling, pale yellow crystals of M.P. 184° C. are obtained.

In an analogous manner there are obtained from the corresponding nitro compound by reduction:

4-(4'-aminophenyl)-2,6-dimethyl-3,5-dicarbomethoxy-1,4-dihydropyridine, M.P. 198° C. (HCl-salt, M.P. 228° C.), 4 - (4' - aminophenyl)-2,6-dimethyl-3,5-dicarbethoxy-1,4-dihydropyridine, M.P. 148° C., 4-(4'-aminophenyl)-2,6-dimethyl-3,5-dicarbo-tert.-butoxy-1,4-dihydropyridine, M.P. 191° C., 4-(3'-aminophenyl)-2,6-dimethyl-3,5-dicarbomethoxy-1,4-dihydropyridine, M.P. 214° C. to 216° C., 4-(3'-aminophenyl)-2,6-dimethyl-3,5-dicarbethoxy-1,4-dihydropyridine, M.P. 151° C.–153° C., 4-(3'-aminophenyl)-2,6-dimethyl-3,5-dicarbo-isopropoxy - 1,4-dihydropyridine, M.P. >250° C., 4-(2'-aminophenyl)-2,6-dimethyl-3,5-dicarbomethoxy-1,4-dihydropyridine, M.P. 170° C., 4-(2'-aminophenyl)-2,6-dimethyl-3,5-dicarbethoxy-1,4-dihydropyridine, M.P. 149° C.–151° C., 4 - (3' - amino - 4'-chlorophenyl)-2,6-dimethyl-3,5-dicarbethoxy-1,4-dihydropyridine, M.P. 215° C. (HCl salt), 4 - (3' - amino-6'-chlorophenyl)-2,6-dimethyl-3,5-dicarbomethoxy-1,4-dihydropyridine, M.P. 209° C. to 210° C., 4 - (3' - amino - 6' - chlorophenyl)-2,6-dimethyl-3,5-dicarbethoxy-1,4-dihydropyridine, M.P. 166° C. to 168° C. (HCl salt M.P. 242° C. to 244° C.).

EXAMPLE 5

4 - (4' - dimethylaminophenyl) - 2,6-dimethyl-3,5-dicarbomethoxy-1,4-dihydropyridine 30 g. p-dimethylamino-benzaldehyde, 45 cc. acetoacetic acid methyl ester, 50 cc. methanol and 21 cc. ammonia are heated at boiling temperature for 4 hours and, after filtering off and cooling, 40 g. of pale yellow crystals of M.P. 194° C. are obtained.

In an analogous manner there are obtained:

from p-dimethylamino-benzaldehyde, acetoacetic acid ethyl ester and ammonia, 4-(4'-dimethylaminophenyl)-2,6 - dimethyl - 3,5 - dicarbethoxy - 1,4-dihydropyridine, M.P. 159° C.;

from p-dimethylamino-benzaldehyde, acetoacetic acid isopropyl ester and ammonia, 4-(4'-dimethylaminophenyl) - 2,6 - dimethyl-3,5-dicarboisipropoxy-1,4-dihydropyridine, M.P. 164° C.;

from p-dimethylamino-benzaldehyde, acetoacetic acid sec.-butyl ester and ammonia, 4-(4'-dimethylaminophenyl) - 2,6 - dimethyl - 3,5-dicarbo-sec.-butoxy-1,4-dihydropyridine, M.P. 125° C.;

from p-dimethylamino-benzaldehyde, acetoacetic acid ethyl ester and ammonia, 4-(4'-dimethylaminophenyl)-2,6-dimethyl-3,5-dicarbo-isobutoxy-1,4-dihydropyridine, M.P. 104° C.–106° C.;

from diethylamino-benzaldehyde, acetoacetic acid ethyl ester and ammonia, 4-(4' - diethylaminophenyl)-2,6-dimethyl - 3,5 - dicarbethoxy - 1,4 - dihydropyridine, M.P. 159° C.;

from diethylamino-benzaldehyde, acetoacetic acid isopropyl ester and ammonia, 4-(4'-diethylaminophenyl)-2,6-dimethyl - 3,5 - dicarbo-isopropoxy-1,4-dihydropyridine, M.P. 192° C.;

from m-nitro-p-dimethylamino-benzaldehyde, acetoacetic acid methyl ester and ammonia, 4-(3'-nitro-4'-dimethylaminophenyl) - 2,6 - dimethyl-3,5-dicarbomethoxy-1,4-dihydropyridine, M.P. 214° C. to 216° C.

EXAMPLE 6

4-(2',4'-dinitrophenyl)-2,6-dimethyl-3,5-dicarbomethoxy-1,4-dihydropyridine

After heating for several hours 9 g. 2,4-dinitrobenzaldehyde, 12 cc. acetoacetic acid methyl ester and 15 cc. ammonia, there are obtained pale brown crystals of M.P. 202° C. to 205° C.

In an analogous manner there was obtained: from 2,4-dinitrobenzaldehyde, acetoacetic acid ethyl ester and ammonia, 4-(2',4'-dinitrophenyl)-2,6-dimethyl-3,5-dicarbethoxy-1,4-dihydropyridine of M.P. 174° C. to 176° C.

*Pharmacology.*—The following pharmacological data represents specific test results of 4-(2'-nitrophenyl)-2,6-dimethyl-3,5-dicarbomethoxy-1,4-dihydropyridine (II) produced according to the process described in Example 1 or 4-(4'-aminophenyl)-2,6-dimethyl-3,5-dicarbethoxy-1,4-dihydropyridine (I) produced according to the process of Example 4. Other specific compounds of the present invention which were tested gave essentially the same results and these two compounds are, therefore, used as illustrative of the various species specifically disclosed in the generic invention as a whole.

When compound I was administered per os to mice, the toxicity was 500 to 1000 mg./kg. of animal weight. When compound I was administered intravenously, the $LD_{50}$ in mice was 160 mg/kg. The phenomenon of poisoning is unspecific. Death occurs after dyspnoea in anoxaemic spasms. In phandorom-narcosis on dogs, an increase of oxygen saturation occurs after application of a coronary catheter, when administering intravenously 0.5 mg./kg. there is a temporary increase, after 1 mg./kg. a marked to strong increase of the oxygen saturation in the coronary sinus up to 45% with a return to the initial value after one hour.

Compound I was also shown to be effected after per os administration. Thus, in one case, after administering 20 mg./kg. of compound I, a strong increase in blood pressure occurred which exhibited a duration of more than 4 hours.

By means of an electromagnetic flow-test measurement at the coronary vessels (dog in phanodorm narcosis), an increase of the coronary blood supply up to 89% can be ascertained after administering 1 mg./kg. [I.V.]. The duration of the effect amounts up to 15 minutes.

On mice compound II has $LD_{50}$ of 375 mg./kg. per os (solvent: polyglycol) and 202 mg./kg. per os (solvent: lutrol). It is approximately 26 mg./kg. when administered intravenously.

BLOOD PRESSURE (RATS)

With 0.125 mg./kg. (I.V.), a slight decrease during injection.

CORONARY EFFECT ON DOGS
Rate of flow

Narcosis—urethane-chloralose:
With 0.005 mg./kg (IV), increase by 40%; after 10 minutes.
With 0.01 mg./kg. (I.V.), increase by 60%; after 20 minutes.
With 0.02 mg./kg. (I.V.), increase by 70%; after 30 minutes.
With 10 mg./kg. (per os) increase by 60%; after 8 hours still 30% above.
The volume per minute increase by 55%.
The blood pressure decreased in these tests by 20–60 mm. Hg.

Oxygen saturation

With 0.005 mg./kg. (I.V.) in 6 tests: a slight to strong increase, after 30–60 minutes.

Phanodorm narcosis

With 0.01 mg./kg. (I.V.) (3 tests) and 0.02 mg./kg. (I.V.) (1 test): strong increase, after 1.5–2 hours.
With 0.05 mg./kg. (I.V.) (3 tests): in 2 tests a marked increase after about 3 hours; in 1 test temporarily slight increase.
With 0.1 mg./kg. (I.V.) strong increase, interrupted after 30 minutes, still 23% above.

Oxygen pressure

Narcosis—urethane-chloralose:
0.5 mg./kg. (per os): marked increase, after about 7 hours (2 tests).
10 mg./kg. (per os) (1 test): marked increase, after 9 hours.
50 mg./kg. (per os): marked increase after 8 hours still above.

Blood pressure

Narcosis—phanodorm:
With 0.005; 0.01; 0.02 and 0.05 mg./kg. (I.V.): marked decrease of varying duration.
With 0.1 mg./kg. (I.V.): continuous strong decrease.
With 0.5 and 1 mg./kg. (I.V.): very strong decrease.
Narcosis—urethane-chloralose:
0005; 0.01 and 0.02 mg./kg. (I.V.): slight decrease;
0.5 mg./kg. (per os) strong decrease.
10 mg./kg. (per os): 1 test a marked, 1 test a strong decrease
50 mg./kg. (per os) continuous strong decrease.

Frequency

Narcosis—phanodorm:
Varying slight effect (I.V. application).
Narcosis—urethane-chloralose:
0.5 mg./kg. (per os): strong varying effect,
10 mg./kg. (per os): strong increase,
50 mg./kg. (per os): strong increase.

The oxygen consumption is decreased, after administering the substance with 1 mg./kg. (per os) by about 20%, with 20 γ/kg. (I.V.) by about 50%. Simultaneously with the strongly increased coronary blood supply, a blood pressure decrease takes place which results in relieving the heart. The consequence of such a peripheral decrease in resistance is a measurable decrease in the consumption of oxygen. In this respect, the compound is similar to the nitrates which are known to be very effective in clinical practice and which also bring about a determinable decrease in oxygen consumption.

The pharmacological point of attack for Compound I and II is probably the smooth musculature of the vessels as such; an effect on the central or vegetative-central nervous structure could not be ascertained.

| Compound of— | Coronary activity on dogs |
|---|---|
| Example 1: | |
| 4-(2'-nitrophenyl)-2,6-dimethyl-3,5-dicarbomethoxy-1,4-dihydropyridine. | 0.005–0.02 mg./kg.I. V.; 0.5–1.0 mg./kg. p.o. |
| 4-(2'-nitrophenyl)-2,6-dimethyl-3,5-dicarbethoxy-1,4-dihydropyridine. | 0.01 mg./kg. I.V. |
| 4-(2'-nitrophenyl)-2,6-dimethyl-3,5-dicarboisopropoxy-1,4-dihydropyridine. | 0.01 mg./kg. I.V. |
| Example 2: | |
| 4-(3'-nitrophenyl)-2,6-dimethyl-3,5-dicarbethoxy-1,4-dihydropyridine. | 0.005 mg./kg. I.V. |
| 4-(3'-nitrophenyl)-2,6-dimethyl-3,5-dicarbomethoxy-1,4-dihydropyridine. | 0.05 mg./kg. I.V. |
| 4-(3'-nitrophenyl)-2,6-dimethyl-3,5-dicarboisopropoxy-1,4-dihydropyridine. | 0.005 mg./kg. I.V. |
| Example 3: | |
| 4-(4'-nitrophenyl)-2,6-dimethyl-3,5-dicarbethoxy-1,4-dihydropyridine. | 2 mg./kg. I.V. |
| 4-(4'-nitrophenyl)-2,6-dimethyl-3,5-dicarboisopropoxy-1,4-dihydropyridine. | 0.2 mg./kg. I.V. |
| Example 4: | |
| 4-(4'-aminophenyl)-2,6-dimethyl-3,5-dicarbethoxy-1,4-dihydropyridine. | 1 mg./kg. I.V. |
| 4-(4'-aminophenyl)-2,6-dimethyl-3,5-dicarbo-tert.-butoxy-1,4-dihydropyridine. | 5 mg./kg. I.V. |
| 4-(3'-amino-6'-chlorophenyl-2,6-dimethyl-3,5-dicarbomethoxy-1,4-dihydropyridine. | 0.5 mg./kg. I.V. |
| 4-(3'-amino-6'-chlorophenyl)-2,6-dimethyl-3,5-dicarbethoxy-1,4-dihydropyridine. | 1 mg./kg. I.V. |
| Example 5: | |
| 4-(4'-dimethylaminophenyl)-2,6-dimethyl-3,5-dicarbo-isopropoxy-1,4-dihydropyridine. | 2 mg./kg. I.V. |
| 4-(4'-diethylaminophenyl)-2,6-dimethyl-3,5-dicarbethoxy-1,4-dihydropyridine. | 5 mg./kg. I.V. |
| Example 6: | |
| 4-(2',4'-dinitrophenyl)-2,6-dimethyl-3,5-dicarbethoxy-1,4-dihydropyridine. | 0.5 mg./kg. I.V. |

The coronary-active compounds can be applied intravenously, orally, intramuscularly, but also in form of suppositories. The ampoules, capsules, sugar - coated pills, tablets, suppositories and the like, which are contemplated for application, generally contain approximately the following quantities; these quantities are listed below for ampoules and capsules by way of example for some compounds:

| | Mg./patient | |
|---|---|---|
| Compound of— | Ampoules | Capsules |
| Example 1: | | |
| 4-(2'-nitrophenyl)-2,6-dimethyl-3,5-dicarbomethoxy-1,4-dihydropyridine | 0.2 | 2.5 |
| 4-(2'-nitrophenyl)-2,6-dimethyl-3,5-dicarbethoxy-1,4-dihydropyridine | 0.2 | 2.5 |
| 4-(2'-nitrophenyl)-2,6-dimethyl-3,5-dicarboisopropoxy-1,4-dihydropyridine | 0.2 | 2.5 |

| Compound of— | Mg./patient | |
| --- | --- | --- |
| | Ampoules | Capsules |
| Example 2: | | |
| 4-(3'-nitrophenyl)-2,6-dimethyl-3,5-dicarbethoxy-1,4-dihydropyridine | 0.2 | 2.5 |
| 4-(3'-nitrophenyl)-2,6-dimethyl-3,5-dicarbomethoxy-1,4-dihydropyridine | 1 | 5 |
| 4-(3'-nitrophenyl)-2,6-dimethyl-3,5-dicarboisopropoxy-1,4-dihydropyridine | 0.2 | 2.5 |
| Example 3: | | |
| 4-(4'-nitrophenyl)-2,6-dimethyl-3,5-dicarbethoxy-1,4-dihydropyridine | 5 | 5–10 |
| 4-(4'-nitrophenyl)-2,6-dimethyl-3,5-dicarboisopropoxy-1,4-dihydropyridine | 2.5 | 5–10 |
| Example 4: | | |
| 4-(4'-aminophenyl)-2,6-dimethyl-3,5-dicarbethoxy-1,4-dihydropyridine | 5–15 | 25 |
| 4-(4'-aminophenyl)-2,6-dimethyl-3,5-dicarbotert.-butoxy-1,4-dihydropyridine | 25 | |
| 4-(3'-amino-6'-chlorophenyl)-2,6-dimethyl-3,5-dicarbomethoxy-1,4-dihydropyridine | 2.5–10 | 25 |
| 4-(3'-amino-6'-chlorophenyl)-2,6-dimethyl-3,5-dicarbethoxy-1,4-dihydropyridine | 5–15 | 25 |
| Example 5: | | |
| 4-(4'-dimethylaminophenyl)-2,6-dimethyl-3,5-dicarbo-isopropoxy-1,4-dihydropyridine | 10–20 | 50 |
| 4-(4'-diethylaminophenyl)-2,6-dimethyl-3,5-dicarboethoxy-1,4-dihydropyridine | 25 | |
| Example 6: | | |
| 4-(2',4'-dinitrophenyl)-2,6-dimethyl-3,5-dicarbethoxy-1,4-dihydropyridine | 2.5–10 | 25 |

For the application in human medicine in the treatment of angina pectoris 1 to 2 ampoules are to be used per day; when the compound is administered in capsules, sugar-coated pills or tablets, 3 doses should be applied per day. The aforesaid quantities refer to persons having a body weight of about 70 kg. The application of suppositories can be varied correspondingly. Nevertheless, it may be required to apply larger or lesser quantities in dependence on the body weight, the mode of application, but also on the reaction of the individual patient to the medicament and the kind of formulation thereof as well as the date and interval of administration. Thus, it may be quite sufficient in some cases to administer less than the above-said minimum dosage, whereas the upper limit has to be exceeded in other cases. If larger doses are administered, it may be expedient to distribute same in several single doses during a day.

The coronary-active compounds being obvious from the disclosure and the examples, respectively, can be applied both for the treatment of an angina pectoris attack and for the prophylactic treatment of angina pectoris.

What is claimed is:

1. A compound selected from the group consisting of 4-phenyl-1,4-dihydropyridines of the formula:

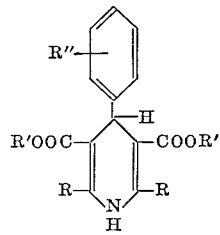

wherein
R is hydrogen or alkyl of 1 to 3 carbon atoms,
R' is alkyl of 1 to 4 carbon atoms, and
R" is hydrogen, 2,4-dinitro, amino, dilower alkylamino, 3-amino-4-chloro, 3-amino-6-chloro, 3-nitro-4-dilower alkylamino, 3-nitro-4-chloro or 3-nitro-6-chloro, or pharmaceutically acceptable non-toxic salts thereof.

2. A compound according to claim 1 wherein R" is amino.

3. The compound of claim 1 which is 4-(3'-nitro-4'-chlorophenyl)-2,6 - dimethyl - 3,5-dicarbethoxy-1,4-dihydropyridine.

4. The compound of claim 1 which is 4-(3'-nitro-6'-chlorophenyl)-2,6-dimethyl-3,5-dicarbomethoxy - 1,4-dihydropyridine.

5. The compound of claim 1 which is 4-(3'-nitro-6'-chlorophenyl)-2,6-dimethyl-3,5-dicarbethoxy - 1,4-dihydropyridine.

6. The compound of claim 1 which is 4-(4'-aminophenyl)-2,6-dimethyl-3,5-dicarbo - isopropoxy - 1,4-dihydropyridine.

7. The compound of claim 1 which is 4-(4'-aminophenyl)-2,6-dimethyl - 3,5 - dicarbomethoxy - 1,4-dihydropyridine.

8. The compound of claim 1 which is 4-(4'-aminophenyl)-2,6-dimethyl-3,5 - dicarbethoxy - 1,4-dihydropyridine.

9. The compound of claim 1 which is 4-(4'-aminophenyl)-2,6-dimethyl-3,5 - dicarbo-tert.-butoxy - 1,4-dihydropyridine.

10. The compound of claim 1 which is 4-(3'-aminophenyl)-2,6-dimethyl-3,5-dicarbomethoxy - 1,4-dihydropyridine.

11. The compound of claim 1 which is 4-(3'-aminophenyl)-2,6-dimethyl-3,5 - dicarbethoxy - 1,4-dihydropyridine.

12. The compound of claim 1 which is 4-(3'-aminophenyl)-2,6-dimethyl-3,5-dicarbo-isopropoxy - 1,4-dihydropyridine.

13. The compound of claim 1 which is 4-(2'-aminophenyl)-2,6-dimethyl-3,5-dicarbomethoxy - 1,4-dihydropyridine.

14. The compound of claim 1 which is 4-(2'-aminophenyl)-2,6-dimethyl-3,5 - dicarbethoxy - 1,4-dihydropyridine.

15. The compound of claim 1 which is 4-(3'-amino-4'-chlorophenyl)-2,6 - dimethyl-3,5 - dicarbethoxy-1,4-dihydropyridine.

16. The compound of claim 1 which is 4-(3'-amino-6'-chlorophenyl)-2,6-dimethyl-3,5 - dicarbomethoxy - 1,4-dihydropyridine.

17. The compound of claim 1 which is 4-(3'-amino-6'-chlorophenyl)-2,6-dimethyl-3,5-dicarbethoxy - 1,4-dihydropyridine.

18. The compound of claim 1 which is 4-(4'-dimethylaminophenyl)-2,6-dimethyl-3,5-dicarbomethoxy - 1,4-dihydropyridine.

19. The compound of claim 1 which is 4-(4'-dimethylaminophenyl)-2,6-dimethyl-3,5-dicarbethoxy - 1,4-dihydropyridine.

20. The compound of claim 1 which is 4-(4'-dimethylaminophenyl)-2,6-dimethyl - 3,5-dicarboisopropoxy-1,4-dihydropyridine.

21. The compound of claim 1 which is 4-(4'-dimethylaminophenyl)-2,6-dimethyl - 3,5 - dicarbo-sec.-butoxy-1,4-dihydropyridine.

22. The compound of claim 1 which is 4-(4'-dimethylaminophenyl)2,6-dimethyl - 3,5 - dicarbo-isobutoxy-1,4-dihydropyridine.

23. The compound of claim 1 which is 4-(4'-diethylaminophenyl)-2,6-dimethyl-3,5 - dicarbethoxy - 1,4-dihydropyridine.

24. The compound of claim 1 which is 4-(4'-diethylaminophenyl)-2,6-dimethyl-3,5 - dicarbo-isopropoxy-1,4-dihydropyridine.

25. The compound of claim 1 which is 4-(3'-nitro-4'-dimethylaminophenyl)-2,6-dimethyl - 3,5 - dicarbomethoxy-1,4-dihydropyridine.

26. The compound of claim 1 which is 4-(2',4'-dinitrophenyl)-2,6-dimethyl-3,5-dicarbomethoxy - 1,4-dihydropyridine.

27. The compound of claim 1 which is 4-(2',4'-dinitrophenyl)-2,6-dimethyl-3,5-dicarbethoxy - 1,4-dihydropyridine.

(References on following page)

References Cited

Chem. Abstracts (I), vol. 64, par. 713–714, 1966.
Kametani et al., Chem. Abstracts (II), vol. 65, par. 20092–20094, December 1966.
Treibs et al., Chem. Abstracts (III), vol. 57, par. 2031–2033, 1962.
Kamal et al., Chem. Abstracts (IV), vol. 61, par. 5605, 1964.

HENRY R. JILES, Primary Examiner

A. L. ROTMAN, Assistant Examiner

U.S. Cl. X.R.

424—266